| United States Patent [19] | [11] Patent Number: 4,855,340 |
| Dangayach | [45] Date of Patent: Aug. 8, 1989 |

[54] STABILIZED EPOXY RESIN COMPOSITIONS

[75] Inventor: Kailash C. B. Dangayach, Houston, Tex.

[73] Assignee: Shell Oil Company, Houston, Tex.

[21] Appl. No.: 158,019

[22] Filed: Feb. 19, 1988

[51] Int. Cl.$^4$ ............................................. C08L 63/00
[52] U.S. Cl. .................................... 523/456; 523/457; 523/466; 528/110
[58] Field of Search ..................... 523/456, 457, 466; 528/110

[56] References Cited

U.S. PATENT DOCUMENTS

| 2,728,744 | 12/1955 | May et al. | 528/110 |
| 3,294,865 | 12/1966 | Price | 528/110 X |
| 3,576,781 | 4/1971 | Hicks | 528/110 X |
| 4,108,824 | 8/1978 | Dante | 523/456 |
| 4,446,307 | 5/1984 | Shirk | 528/110 X |

*Primary Examiner*—Earl Nielsen

[57] ABSTRACT

A composition is described which includes an epoxy resin, a solid particulate filler and 1,2-propylene glycol. The 1,2-propylene glycol is present in an amount effective to suppress filler settle from the epoxy. The composition is particularly suitable for electrical encapsulation applications.

13 Claims, No Drawings

STABILIZED EPOXY RESIN COMPOSITIONS

BACKGROUND OF THE INVENTION

The invention relates to epoxy resin compositions. In a specific aspect, the invention relates to the stabilization against filler settling of an epoxy resin composition containing a particulate filler.

Epoxy resins are used as thermosettable components of formulations for encapsulating electrical components. In this application, the epoxy resin is conventionally used in combination with a solid particulate filler material, such as alumina trihydrate, tabular alumina, calcium carbonate, silica and the like. The filler not only lowers the cost of the encapsulating material, but also provides an encapsulating formulation having improved modulus and lower coefficient of thermal expansion than the unfilled epoxy formulation. Filled epoxy encapsulation formulations, however, suffer from the problem of reduced shelf life as a result of filler settling upon storage. The filler material settles to the bottom of the container and forms a hard means which is difficult to redisperse through the formulation. Tabular alumina and alumina trihydrate, which are popular filler materials, are particularly difficult to maintain in dispersion. The problem of filler settling necessitates either preparation of the encapsulation formulation at or near the time of application, which may be timeconsuming and inconvenient for end-users, or the risk of using a formulation from which a portion of the filler has settled, which can result in compromised encapsulation properties. Additives, such as 1,2,3-trihydroxy propane, for example, have been used to inhibit filler settling, but have been found ineffective in stabilizing alumina trihydrate filler or have the liability of unacceptably increasing the viscosity of the formulation. Furthermore, some additives are effective only if the filler is added to the epoxy-additive formulation immediately after the formulation is prepared, but are not effective if the epoxy-additive formulation is stored for even a few days before filler addition.

It is therefore an object of the invention to provide filled epoxy resin formulations which have lengthed shelf life and improved resistance to filler settling during storage. In one aspect, it is an object of the invention to provide a method for settle inhibition for epoxy formulations which does not unacceptably increase the formulation viscosity.

SUMMARY OF THE INVENTION

According to the invention, an epoxy resin composition is provided which comprises an epoxy resin and 1,2-propylene glycol. Further according to the invention, a filled epoxy resin composition is provided which comprises an epoxy resin, a solid particulate filler and 1,2-propylene glycol. Addition of 1,2-propylene glycol has been found to be an effective anti-settling method for filled epoxy resin formulations, including those filled with tabular alumina and alumina trihydrate.

DETAILED DESCRIPTION OF THE INVENTION

The invention composition includes an epoxy resin. The epoxy resin component of the composition can be any curable resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10, preferably in the range of 0 to 2.

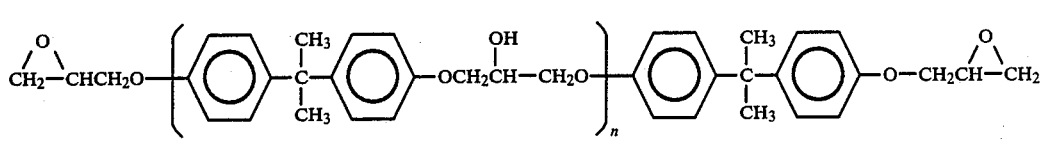

The epoxy resin can also include bisphenol formaldehyde-type resins which are the reaction products of epichlorohydrin and bisphenol-F, and dihydroxy biphenyl-based resins, for example. Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol. Also included are cycloaliphatic epoxides and the products of hydrogenation of epoxides as described in formula I.

Epoxy resins suitable for the invention compositions have molecular weights generally within the range of 50 to about 2,000, preferably about 100 to about 1,000. The commercially-available epoxy resin Epon ® Resin 828, a reaction product of epichlorohydrin and 2,2-bis(4-hydroxyphenyl)propane (bisphenol-A) having a molecular weight of about 400, an epoxide equivalent (ASTM D-1652) of about 185–192, and an n value (from formula I above) of about 0.2, is presently the preferred epoxy resin because of its low viscosity and commercial availability.

The invention composition contains a solid particulate filler. The filler can be any one of a combination of various particulate materials, depending upon the economics of the application and the properties desired. A number of fillers or "extenders" are commonly used for epoxy resin formulations. Common solid particulate fillers for use in encapsulation-type formulations include, for example, alumina trihydrate, tabular alumina, calcium carbonate, silica, glass fibers and beads, magnesium carbonate, clay, chalk, titanium dioxide, talc, carbon black and silicon dioxide. The filler will be present in the composition in an amount effective to impart the desired properties to the final formulation. In general, the filler will be present in an encapsulation formulation in an amount within the range of about 1 to about 90 weight percent, preferably about 25 to about 80 weight percent, most preferably about 45 to about 75 weight percent, based on the weight of the total composition.

The invention composition contains 1,2-propylene glycol in an amount effective to inhibit filler settling from a mixture of an epoxy resin and a particulate filler. With certain fillers, the maximum amount may be dictated by any undesirable thickening effect produced by the anti-settling additive. The 1,2-propylene glycol will generally be present in the composition in an amount within the range of about 0.1 to about 5 weight percent, preferably about 0.1 to about 2 weight percent, most preferably about 0.5 to about 2 weight percent based on the weight of the epoxy resin. The 1,2-propylene glycol is available commercially in pure technical grade form from Aldrich Chemical Company.

The invention composition can optionally contain other components depending upon the properties desired in the final formulation. Optional components of encapsulation formulations include pigments, anti-oxidants, plasticizers, flame retardants, mold-release agents, defoaming agents, and the like. Reactive diluents such as $C_{2-20}$ aliphatic and cycloaliphatic glycidyl ethers, for example, can be used for viscosity modification.

The filled epoxy resin formulation will for most end uses be used in combination with a curing agent for the epoxy resin. The curing agent can be selected from a wide variety of curing materials known in the art including aliphatic amines such as 1,2-diaminocyclohexane, aromatic amines such as 2,4-bis(p-aminobenzyl)aniline, anhydrides such as trimellitic anhydride, imidazoles such as 2-ethyl-4-methylimidazole, and cationic curing agents such as boron trifluoride complexes. Such curing agents will generally be present in the formulation in an amount of from about 0.5 to about 1.5 equivalents per epoxy equivalent. The curing agent will generally be added to the epoxy resin formulation shortly before application, but the curing agent can be selected, and the storage conditions designed, so as to permit premixing of the epoxy resin and curing agent for later combination with a filler material and application.

The 1,2-propylene glycol-containing filled epoxy composition is most suitably prepared by combining, in a rotary mixer, a liquid epoxy resin, 1,2-propylene glycol and selected optional components as listed above, then slowly stirring in, with vigorous mixing, the filler material and continuing mixing until the filler is saturated. Mixing time can vary from a few minutes to an hour or more. The filled epoxy resin formulation can be stored in containers prior to use or used immediately. A curing agent will generally be mixed with the formulation immediately prior to use. Other techniques for combining the ingredients can be envisioned, such as, for example, coating the filler material with the 1,2-propylene glycol prior to adding the filler to the epoxy resin.

The invention composition is particularly suited for application in electronic part encapsulation which, as used herein, includes encasing both micro and macro electronic components, but can also be used in coatings, adhesives, tooling and structural applications, for example.

EXAMPLE 1

This example illustrates preparation of a stabilized epoxy resin formulation containing a particulate filler. Test formulations were prepared by mixing 40 weight percent (based on the weight of the total filled composition) of Epon ® 828 epoxy resin, 0.02 weight pecent of a commercial defoaming agent solution, and the indicated weight percent of 1,2-propylene glycol anti-settling additive. A control formulation with no anti-settling additive was prepared. Formulations which were to be aged before filler addition were left in the mixing vessel, covered with aluminum foil and allowed to age for 3 days. After the aging period, if any, 8 weight percent alkyl glycidyl ether active diluent and 1 weight percent titanium dioxide pigment were added with vigorous mixing. Then about 50 weight percent alumina trihydrate filler was added slowly over about ten minutes with mixing, followed by additional vigorous mixing for 20 minutes. The formulation was divided evenly by weight into containers. The filler which settled from the formulation to the bottom of the container was sampled after the periods of time shown in Table 1 and the sample was weighed. Percent reduction in settling was determined by comparison of weighed samples with samples obtained from the control formulation containing no 1,2-propylene glycol. The results of the settling tests are shown in Table 1 below.

TABLE 1

| | Aluminum Trihydrate Filler Settle From Epoxy Formulation | | | | | |
|---|---|---|---|---|---|---|
| | No Aging[a] | | | 3 Days Aging[b] | | |
| Elapsed Time (days)[c] | % PG Added[d] | Grams Settle | % Settle Reduction | 1,2-PG Added[d] | Grams Settle | % Settle Reduction |
| 3 | 0.0 | 8.0 | control | 0.0 | 8.9 | control |
| | 1.0 | 0.5 | 94 | 1.0 | 14.9 | 0 |
| | 1.6 | 0.0 | 100 | 1.6 | 0.0 | 100.0 |
| 7 | 0.0 | 21.9 | control | 0.0 | 14.6 | control |
| | 1.0 | 1.1 | 95 | 1.0 | 21.6 | 0 |
| | 1.6 | 0.0 | 100 | 1.6 | 0.0 | 100.0 |
| 10 | 0.0 | 27.2 | control | 0.0 | 51.0 | control |
| | 1.0 | 1.0 | 96 | 1.0 | 37.4 | 27 |
| | 1.6 | 0.2 | 99 | 1.6 | 0.1 | 100 |
| 14 | 0.0 | 37.8 | control | 0.0 | 38.8 | control |
| | 1.0 | 1.2 | 97 | 1.0 | —[e] | —[e] |
| | 1.6 | 0.2 | 99 | 1.6 | 0.2 | 99 |
| 21 | 0.0 | 43.3 | control | 0.0 | 42.9 | control |
| | 1.0 | 2.3 | 95 | 1.0 | —[e] | —[e] |
| | 1.6 | 0.4 | 99 | 1.6 | 0.6 | 99 |
| 28 | 0.0 | 51.9 | control | 0.0 | 51.9 | control |
| | 1.0 | 3.0 | 94 | 1.0 | —[e] | —[e] |

TABLE 1-continued

Aluminum Trihydrate Filler Settle From Epoxy Formulation

| Elapsed Time (days)[c] | No Aging[a] | | | 3 Days Aging[b] | | |
|---|---|---|---|---|---|---|
| | % PG Added[d] | Grams Settle | % Settle Reduction | 1,2-PG Added[d] | Grams Settle | % Settle Reduction |
| | 1.6 | 0.4 | 99 | 1.6 | 0.6 | 99 |

[a]Filler material was added immediately after epoxy resin formulation was prepared.
[b]Filler material was added three days after epoxy resin formulation was prepared.
[c]Settled material sampled and sample weighed the indicated number of days after the filler was added.
[d]Weight percent of 1,2-propylene glycol added, based on weight of epoxy resin.
[e]Not measured. Filler settle was very high.

The results show the effectiveness of 1,2-propylene glycol in inhibiting filler settlement in epoxy resin formulations containing aluminum trihydrate filler. The additive was effective, when added in an amount of 1.6 weight percent, in suppressing filler settling even when the epoxy formulation was aged prior to addition of the filler. This is an important feature of the additive, as the epoxy may be shipped or stored prior to addition of the filler for the end-use application.

EXAMPLE 2

Test formulations were prepared as in Example 1, except that the filler was calcium carbonate. Table 2 below shows the results of settling tests on epoxy formulations containing calcium carbonate filler.

TABLE 2

Calcium Carbonate Filler Settle from Epoxy Formulation

| Elapsed Time (days) | % PG Added | Grams Settle | % Settle Reduction |
|---|---|---|---|
| 4 | 0 | 0.75 | control |
| | 1.6 | 0.04 | 95 |
| 7 | 0 | 2.2 | control |
| | 1.6 | 0.3 | 86 |
| 11 | 0 | 3.6 | control |
| | 1.6 | 0.5 | 86 |
| 14 | 0 | 7.2 | control |
| | 1.6 | 0.9 | 88 |

EXAMPLE 3

Test formulations were prepared as in Example 1, except that 1.0 weight percent of various glycols were added to assess anti-settling effectiveness. The additive was considered effective (shown by "Yes" on Table 3) if it reduced 10-day filler settling by more than 70%. The formulations were observed for increases in viscosity, with "Yes" on Table 3 indicating that the filled formulation was too viscous to flow smoothly.

TABLE 3

Anti-settling Effects of Various Polyhydric Alcohols

| Alcohol | Filler Settle Reduced | | Viscosity Increased |
|---|---|---|---|
| 1,2-butanediol | No | (0%) | No |
| 1,2,4-butanetriol | Yes | (100%) | Yes |
| Ethylene glycol | Yes | (99%) | Yes |
| Glycerol | Yes | (100%) | Yes |
| 1,2-Hexanediol | No | (0%) | Yes |
| 1,2,6-Hexanetriol | Yes | (98%) | Yes |
| 1,2-Octanediol | Yes | (99%) | Yes |
| 1,2-Pentanediol | No | (0%) | Yes |
| Polyethylene glycol 200 | No | (65%) | No |
| Polyethylene glycol 400 | No | (0%) | No |
| Polypropylene glycol 400 | No | (0%) | No |
| 1,3-Propanediol | No | (10%) | No |
| 1,2-Propylene glycol | Yes | (96%) | No |

As can be seen from Table 3, 1,2-propylene glycol was the only additive tested which inhibited filler settlement and did not unacceptably increase the viscosity of the formulation.

I claim:
1. A composition comprising
   (a) an epoxy resin;
   (b) from about 0.5 to about 2 weight percent, based on the weight of the epoxy resin, of 1,2-propylene glycol;
   (c) an effective amount of a curing agent for the epoxy resin, and curing agent selected from the group consisting of aliphatic amines, aromatic amines, anhydrides and imidazoles; and
   (d) a particulate filler.
2. The composition of claim 1 in which epoxy resin is a liquid diglycidyl ether of bisphenol-A.
3. The composition of claim 1 in which the epoxy resin is a liquid diglycidyl ether of bisphenol-F.
4. The composition of claim 1 in which the solid particulate filler is selected from the group consisting of alumina trihydrate, tabular alumina, calcium carbonate and silica.
5. The composition of claim 1 in which the solid particulate filler is selected from the group consisting of alumina trihydrate and tabular alumina.
6. A composition comprising:
   (a) a mixture of an epoxy resin and a particulate filler;
   (b) 1,2-propylene glycol present in the composition in an amount effective to inhibit settling of the filler from said mixture and within the range of from about 0.5 to about 2 weight percent, based on the weight of the epoxy resin; and
   (c) an effective amount of a curing agent for the epoxy resin selected from the group consisting of aliphatic amines, aromatic amines, anhydrides and imidazoles.
7. The composition of claim 6 in which the particulate filler is present in the composition in an amount within the range of about 5 to about 90 weight percent, based on the weight of the composition.
8. The composition of claim 7 in which the particulate filler is selected from the group consisting of alumina trihydrate, tabular alumina, calcium carbonate and silica.
9. The composition of claim 7 in which the particulate filler is selected from the group consisting of alumina trihydrate and tabular alumina and is present in the composition in an amount within the range of about 45 to about 75 weight percent.
10. The composition of claim 6 in which the epoxy resin is a diglycidyl ether of bisphenol-A.
11. The composition of claim 6 in which the epoxy resin is a diglycidyl ether of bisphenol-F.
12. The composition of claim 6 in which the 1,2-propylene glycol is present in an amount within the range of about 0.5 to about 2 weight percent, based on the weight of the epoxy resin, and the particulate filler is selected from the group consisting of alumina trihydrate, tabular alumina, calcium carbonate and silica.

13. A method for inhibiting filler settle from a filled epoxy resin composition containing a curing agent for the epoxy resin selected from the group consisting of aliphatic amines, aromatic amines, anhydrides and imidazoles, the method comprising incorporating in the filled epoxy resin composition 1,2-propylene glycol in an amount within the range of about 0.5 to about 2 weight percent, based on the weight of the epoxy resin.

* * * * *